United States Patent
Morimura

(10) Patent No.: US 11,007,656 B2
(45) Date of Patent: May 18, 2021

(54) ROBOT UNIT

(71) Applicant: OKUMA Corporation, Aichi (JP)

(72) Inventor: Shoichi Morimura, Aichi (JP)

(73) Assignee: OKUMA CORPORATION, Aichi (JP)

(*) Notice: Subject to any disclaimer, the term of this patent is extended or adjusted under 35 U.S.C. 154(b) by 0 days.

(21) Appl. No.: 16/571,560

(22) Filed: Sep. 16, 2019

(65) Prior Publication Data

US 2020/0094423 A1     Mar. 26, 2020

(30) Foreign Application Priority Data

Sep. 21, 2018    (JP) .............................. JP2018-177806

(51) Int. Cl.
| | |
|---|---|
| *B25J 17/00* | (2006.01) |
| *B25J 17/02* | (2006.01) |
| *B25J 18/00* | (2006.01) |
| *B25J 19/00* | (2006.01) |
| *B25J 11/00* | (2006.01) |

(52) U.S. Cl.
CPC .......... *B25J 19/0075* (2013.01); *B25J 11/005* (2013.01)

(58) Field of Classification Search
CPC .... B25J 19/0075; B25J 11/005; B25J 9/0009; B25J 21/00; B25J 18/00; B25J 17/025; B25J 9/08
See application file for complete search history.

(56) References Cited

U.S. PATENT DOCUMENTS

| | | | | |
|---|---|---|---|---|
| 4,931,617 | A * | 6/1990 | Toyoda | .................. B23K 9/287 |
| | | | | 174/350 |
| 2017/0326700 | A1 | 11/2017 | Morimura | |
| 2017/0348772 | A1 | 12/2017 | Morimura | |
| 2018/0031797 | A1* | 2/2018 | Kobayashi | ............... G02B 7/08 |
| 2018/0126567 | A1 | 5/2018 | Morimura | |
| 2018/0370049 | A1* | 12/2018 | Yoon | ........................ B25J 18/02 |
| 2019/0134811 | A1* | 5/2019 | Haddadin | .............. B25J 9/0009 |
| 2019/0145498 | A1* | 5/2019 | Yoon | .................... F16H 19/0636 |
| | | | | 74/490.04 |

FOREIGN PATENT DOCUMENTS

| | | |
|---|---|---|
| JP | 2017202548 A | 11/2017 |
| JP | 2017213658 A | 12/2017 |
| JP | 2018020402 A | 2/2018 |

\* cited by examiner

*Primary Examiner* — Jake Cook
(74) *Attorney, Agent, or Firm* — Cantor Colburn LLP

(57) ABSTRACT

A robot unit includes a robot main body that is an arm-type robot including multiple links connected to one another via at least one joint, and one or more protective housings that cover and protect at least a portion of a circumferential surface of one or more of the multiple links. One or more fastening portions that attach and detach the protective housing are provided on a circumferential surface of the one or more of the multiple links.

8 Claims, 8 Drawing Sheets

ROBOT UNIT

CROSS REFERENCE TO RELATED APPLICATION

The present application claims priority under 35 U.S.C. § 119 to Japanese Patent Application No. 2018-177806 filed on Sep. 21, 2018, which is incorporated herein by reference in its entirety including the specification, claims, drawings, and abstract.

TECHNICAL FIELD

The present specification discloses a robot unit including a robot main body that is an arm-type robot with multiple links connected to one another via at least one joint.

BACKGROUND

Arm-type robots having multiple links connected to one another via joints have been widely known. Such arm-type robots are installed, for example, in factories and are used to manufacture products. In recent years, arm-type robots are sometimes proposed to be installed, in particular, in machining chambers of machine tools. For example, JP 2017-202548A discloses an arm-type robot attached to a spindle of a machine tool; JP 2017-213658A discloses an arm-type robot attached to a tool post of a machine tool; and JP 2018-020402A discloses an arm-type robot attached to a spindle of a machine tool.

SUMMARY

The ambient environment around such an arm-type robot may vary. For example, in the above mentioned patent documents, the arm-type robots are installed in machining chambers of machine tools. In the machining chambers, swarf and cutting water may scatter during machining of a workpiece. Strong vibration or heat may also be caused depending on the type of machining. Such swarf, cutting water, vibration, and heat may be deterioration factors of the arm-type robots.

Arm-type robots need to have durable configurations against such swarf, cutting water, vibration, and heat. However, the types of the deterioration factors vary in accordance with the types of machining performed by the machine tool. The degree of the effects caused by the deterioration factors to the arm-type robots significantly varies in accordance with a position of the arm-type robot during machining (in particular, a position relative to the machining point) or other conditions. Thus, the durable configuration desired for the arm-type robot varies in accordance with ambient environment or use conditions of the arm-type robot. However, there have been no such robots whose durable configuration can be changed in accordance with ambient environment and use conditions of the arm-type robot.

The present specification discloses a robot unit including an arm-type robot whose durable configuration can be changed in accordance with ambient environment and use conditions of the robot.

A robot unit disclosed in the present specification includes a robot main body that is an arm-type robot having multiple links connected one another via at least one joint, and at least one protective housing that covers and protects at least a portion of a circumferential surface of at least one of the multiple links. At least one fastening portion that is capable of attaching and detaching the at least one protective housing is provided on a circumferential surface of at least one of the multiple links.

In the above configuration, because the protective housing can be attached or detached in accordance with ambient environment or use conditions of the robot, the durable configuration of the arm-type robot can be changed.

In the above case, the at least one protective housing may include at least one united-type protective housing that extends across two or more links. Each of the at least one united-type protective housing may include multiple protective portions, each of which is configured to cover at least a portion of a circumferential surface of the corresponding one of the multiple links. Each of the at least one united-type protective housing may further include at least one connecting portion that inseparably connects two protecting portions such that a change is allowed in relative orientation relationships between the two protecting portions.

In the above configuration, because the protective housing can also cover the joints of the arm-type robot, the joints can also be protected as required.

The at least one protective housing may include at least one separable-type protective housing that covers only one of the multiple links.

In the above configuration, because the protective housing does not extend across two or more links, movement of the link is unlikely to be constrained by the protective housing.

The protective housing may be splittable into two or more in a lateral direction of the link.

In the above configuration, the protective housing is easily attachable to the link.

The protective housing may be made from a material such that at least one of a thermal resistance temperature, rigidity, and chemical resistance of the material is higher than that of a chassis of the link.

In the above configuration, the thermal resistance, the impact resistance, and the chemical resistance of the robot unit is improved to be higher than in a case using the robot main body alone.

The protective housing may include a thermal insulation material or a thermal insulation structure that prevents heat transfer between the ambient environment and a chassis of the link.

In the above configuration, because heat transfer to internal portions of the robot can be reduced, failures of a motor, an encoder, or the like caused by a temperature increase can be avoided.

Multiple protective housings of different types that are attachable to the at least one fastening portion may be provided, and made from different materials and/or have different shapes. The protective housing to be attached to the at least one fastening portion may be replaceable.

In the above configuration, because the protective housing can be replaced in accordance with ambient environment or use conditions of the robot, the durable configuration of the arm-type robot can be freely changed.

The robot main body may include one or more end effector connectors that attach or detach an end effector. Multiple end effectors of different types that are attachable to the one or more end effector connectors may be provided such that the end effector attached to one of the end effector connectors is replaceable.

In the above configuration, because various applications of the robot unit become available, versatility of the robot unit is improved.

The robot main body may be disposed inside a machining chamber of a machine tool.

In the above configuration, because more various operations of the machine tool become available, productivity of the machine tool is improved.

According to the robot unit disclosed in the present specification, because the productive housing may be attached or detached in accordance with ambient environment or use conditions of the robot, the durable configuration of the arm-type robot can be changed.

BRIEF DESCRIPTION OF DRAWINGS

Embodiments of the present disclosure will be described based on the following figures, wherein.

DESCRIPTION OF EMBODIMENTS

Figure 1:
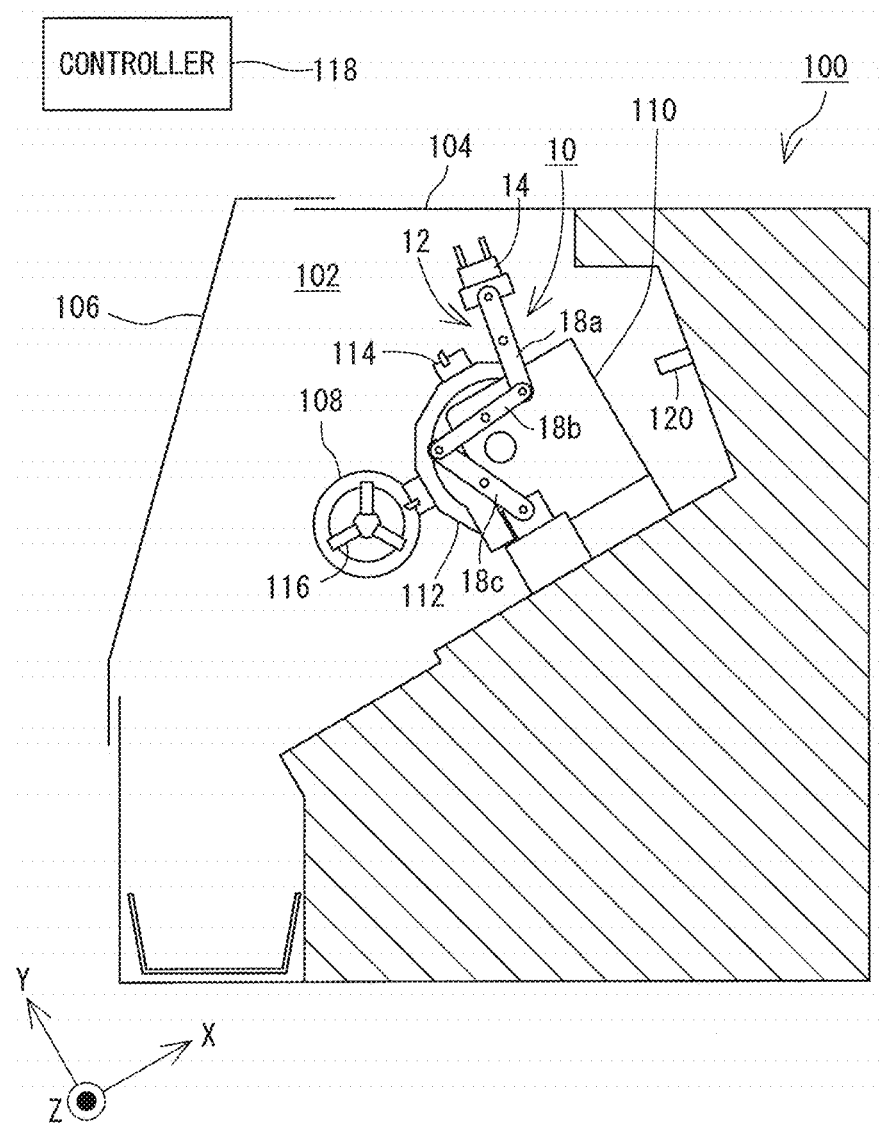
FIG. 1 is a schematic cross sectional view of a machine tool which incorporates a robot unit.
Figure 2:
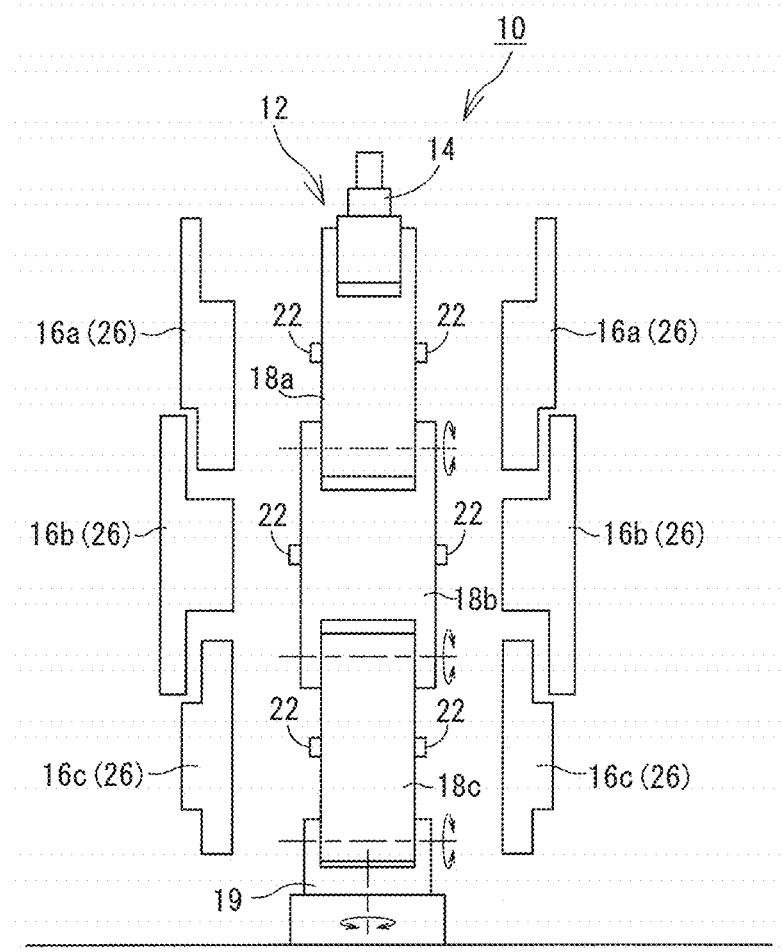
FIG. 2 is a schematic exploded front view of a robot unit.

A robot unit 10 is described below with reference to the attached drawings. FIG. 1 is a schematic cross sectional view of a machine tool 100 which incorporates the robot unit 10. FIG. 2 is a schematic exploded front view of the robot unit 10. FIG. 1 omits an illustration of a protective housing 16 of the robot unit 10 in order to simplify description. In description below, the direction parallel to the rotation axis of a spindle 108 is called the "Z axis", the direction perpendicular to the Z axis and parallel to a moving direction of a tool post 110 is called the "X axis", and the direction perpendicular to the X and Z axes is called the "Y axis".

First, the machine tool 100 incorporating the robot unit 10 is briefly described. The machine tool 100 is a lathe that machines a workpiece (not shown in FIG. 1 and FIG. 2) in rotation by applying a tool 114 held by the tool post 110. Specifically, the machine tool 100 is a numerically controlled (NC) turning center provided with a turret 112 that holds multiple tools 114.

The machine tool 100 is housed in an enclosure 104 of a machining chamber 102 of the machine tool 100. A large opening is provided at the front of the machining chamber 102, and the opening is opened or closed by a door 106. The machine tool 100 includes a spindle unit that rotatably holds one end of a workpiece, the tool post 110 that holds the tool 114, and a tailstock (not shown) that holds the other end of the workpiece. The spindle unit includes a head stock (not shown) with a built-in rotary motor, and a spindle 108 attached to the head stock. The spindle 108 includes a chuck 116 or a collet that removably holds the workpiece so that the workpiece to be hold can be replaced as required. The spindle 108 and the chuck 116 rotate about a rotation axis extending horizontally (along the Z axis).

The tailstock is disposed to oppose the spindle 108 along the Z axis so that the spindle 108 holds one end of the workpiece, whereas the tailstock holds the other end of the workpiece. The tailstock is movable along the Z axis such that the tailstock can move towards or away from the workpiece.

The tool post 110 holds the tool 114, such as a cutting tool called a "tool bit". The tool post 110 is movable in parallel to the Z axis or the X axis to adjust the position of the tip of the blade of the tool 114.

The turret 112 is a polygon when viewed in a Z axis direction and rotatable about an axis in parallel to the Z axis. One or more tools 114 are removably attached to the circumferential surface of the turret 112 such that the tool 114 to be used for machining can be changed by rotating the turret 112.

A controller 118 controls operations of every sections of the machine tool 100 in accordance with instructions from an operator. The controller 118 may include, for example, a CPU that performs various operations, and a memory that stores various control programs or control parameters. The controller 118 also has a communication function to transmit or receive various data, such as NC program data, to or from other devices. For example, the controller 118 may include an NC controller that calculates the position of the tool 114 or the workpiece as needed. The controller 118 may be a single unit or a combination of multiple arithmetic units. The controller 118 may also control the robot unit 10 described below, or the robot unit 10 may be controlled by another controller.

The robot unit 10 is also disposed inside the machining chamber 102. The robot unit 10 includes a robot main body 12, an end effector 14 attached to the robot main body 12, and protective housing sections 16a to 16c (not shown in FIG. 1) that cover outer surfaces of the robot main body 12. When respective protective housing sections 16a to 16c are not separately referred to, the whole housing is merely described as a "protective housing 16" by omitting the suffixed letters after the number. Other sections are described in the same manner. The robot main body 12 is an arm-type robot with an arm 18; specifically, multiple links 18a to 18c (three links in the present embodiment shown in the drawings) connected one another via at least one joint. In the present embodiment, the robot main body 12 is disposed on a floor of the machining chamber 102. Of course, the robot main body 12 may be disposed at any other position. For example, the robot main body 12 may be disposed on a side surface of the machining chamber 102 or the spindle 108. Alternatively, the robot main body 12 may be disposed on a movable body that is movable in the machining chamber 102, such as the tool post 110, the turret 112, or the tailstock. The movable range of the robot main body 12 can be broadened by disposing the robot main body 12 on the movable bodies. When the robot main body 12 is installed in a milling machine, a machining center, or a multi-tasking machine, the robot main body 12 may be disposed on a spindle head, a table on which a workpiece is disposed, or at other positions.

As shown in FIG. 2, the robot main body 12 in the present embodiment is a vertical articulated robot including three links 18a to 18c that can be swingable about a horizontal axis (swingable in a vertical plane). A rotatable joint 19 that is rotatable about a vertical axis is disposed at a proximal end of the robot main body 12. The arm 18 is made from a hollow chassis made from, for example, a metal (aluminum or other metal). An actuator (for example, a motor), a transmission mechanism (for example, a gear), and a sensor (for example, a rotary encoder) are disposed in the chassis of the arm 18 so that the arm 18 swings by being driven by the actuator. Wirings for transmitting and receiving signals and electric power are also enclosed in the chassis of the arm 18.

Fastening portions 22 that attach and detach the protective housing 16 described below are provided on outer surfaces of the links 18a to 18c. The number and the shape of the fastening portions 22 are not limited to any specific number or shape, so long as the fastening portions 22 can attach and detach the protective housing 16. Thus, the fastening portions 22 may be screw holes that attach and detach the protective housing 16 by screwing, or engaging claws or grooves that attach and detach the protective housing 16 by engagement. In another embodiment, the fastening portions 22 may have a structure to attach and detach the protective housing 16 using a force of a spring 50 or a magnet. Alternatively, each of the fastening portions 22 may be a "one-touch damper" that can attach or detach the protective housing 16 with "one touch", which means to perform any one of pressing, pulling, or rotating. An example of such a one-touch damper is described further below.

The robot main body 12 includes the end effector 14, which accesses a target to cause some effects on the target. The "accessing" means that the end effector 14 approaches the target to a position near enough to achieve the task of the end effector 14. When the end effector 14 is a temperature sensor that senses the temperature of the target while being in contact with the target, the "accessing" means that the end effector 14 comes in contact with the target. In contrast, when the end effector 14 is a non-contact temperature sensor, the "accessing" means that the end effector 14 approaches to a position near enough to sense the temperature of the target.

One or more end effectors 14 may be attached to the single robot main body 12. The end effector 14 may be attached to the distal end or any middle point of the robot main body 12. In the present embodiment, the single end effector 14 is attached to the distal end of the robot main body 12.

The end effector 14 is not limited to any particular type so long as the end effector 14 causes some effects as described above. The end effector 14 may be, for example, a holding device (a hand mechanism, a suction and hold mechanism, or the like) that holds a target. In another embodiment, the end effector 14 may be a sensor (for example, a temperature sensor, a vibration sensor, a contact sensor, a pressure sensor, or the like) that senses information about the target or ambient environment of the target. In still another embodiment, the end effector 14 may be a press mechanism that presses a target. For example, the end effector 14 may be rollers that reduce vibrations by pressing a workpiece while allowing rotation of the workpiece. In still another embodiment, the end effector 14 may be a dispenser of fluid (for example, air, cutting oil, or cutting water) to assist in machining. The end effector 14 may be an emitter of energy (for example, laser or electric arc) or materials (for example, materials for additive manufacturing) to shape the workpiece. In still another embodiment, the end effector 14 may be a camera that captures an image of a target.

The end effector 14 described above may be removable from the robot main body 12 so that the end effector 14 can be replaced as required. For example, before the start of machining, a hand mechanism end effector 14 may be attached to the robot main body 12 to carry a workpiece using the hand mechanism. After carrying the workpiece, the hand mechanism end effector 14 may be replaced with a temperature sensor end effector 14 to sense the temperature of the workpiece or the tool 114 during machining. Such a replaceable configuration can broaden an applicable scope of the robot unit 10. Of course, the end effector 14 may be non-detachably fixed to the robot main body 12. Although in the embodiments shown in the drawings the single end effector 14 is attached to the distal end of the robot main body 12, no limitation is imposed on the number of the end effectors 14 attached to the single robot main body 12. One or more end effectors 14 may be attached. The attachment position of the end effector 14 to the robot main body 12 may be at the distal end or any middle position of the robot main body 12.

The robot unit 10 includes the protective housing 16 that at least partially protects the outer surfaces of the one or more links 18a to 18c. The protective housing 16 is removably attached to the robot main body 12 via the above described fastening portions 22. The reason to provide the protective housing 16 is briefly described below.

As described above, the robot main body 12 in the present embodiment is installed in the machining chamber 102 of the machine tool 100. Properties required for the robot main body 12 vary significantly depending on the machining conditions and the position of the robot main body 12 (in particular, the position relative to the machining point). For example, swarf and cutting water scatter in the machining chamber 102 during machining of a workpiece. When the arm 18 of the robot main body 12 is positioned in an area where swarf or other debris reaches, the arm 18 needs to be protected against swarf or other debris, whose properties may vary in accordance with machining conditions. For example, when rigid swarf scatters, the arm 18 needs to have a rigid chassis even though such a rigid chassis makes the arm 18 heavier or larger to some degree. In contrast, when soft continuous swarf scatters, the arm 18 needs to have a light chassis even though such a light chassis reduces the rigidity of the arm 18 to some degree. When the swarf is at a high temperature, the arm 18 needs to have a highly heat resistant chassis. When cutting water or oil scatters, the ingress of cutting water or oil into space of the joints needs to be prevented.

When the end effector 14 of the robot unit 10 is replaceable, the application of the robot main body 12 varies in accordance with the type of the end effector 14. When the application varies, a desired structure, in particular, durability of the robot main body 12, significantly varies.

Thus, it has been difficult to always ensure sufficient durability of the robot main body 12, because the required property, in particular, durability of the robot main body 12, varies as required. In embodiments of the present disclosure, because two or more protective housings 16 of different types that can be attached and detached to the arm 18 are provided, the protective housing 16 attached to the arm 18 can be replaced as required. In this way, the properties, in particular durability, of the robot unit 10 can be changed in accordance with conditions. As a result, the life span of the robot unit 10 can be extended, and the quality of machining can be improved. The protective housing 16 is described below.

Figure 3:
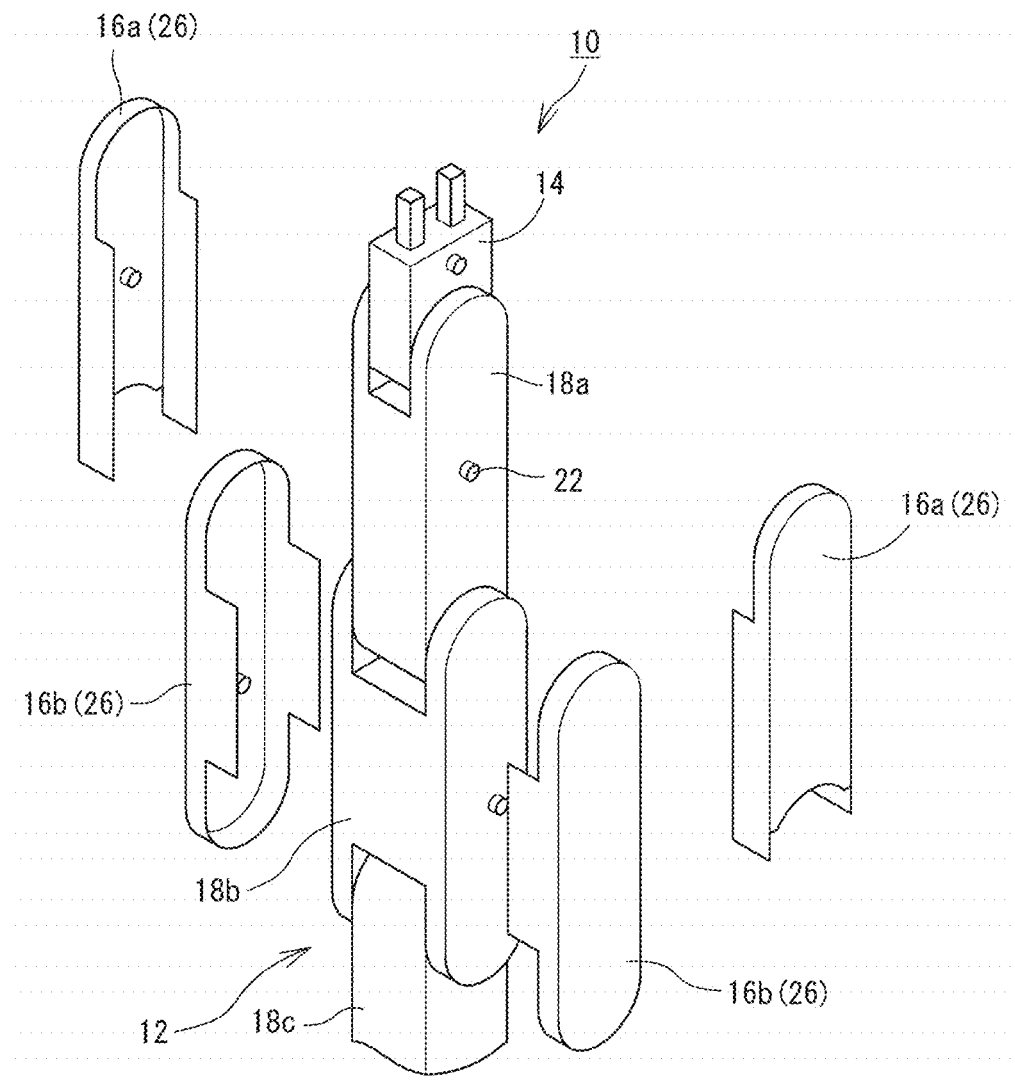
FIG. 3 shows an example of a separable-type protective housing.
Figure 4:
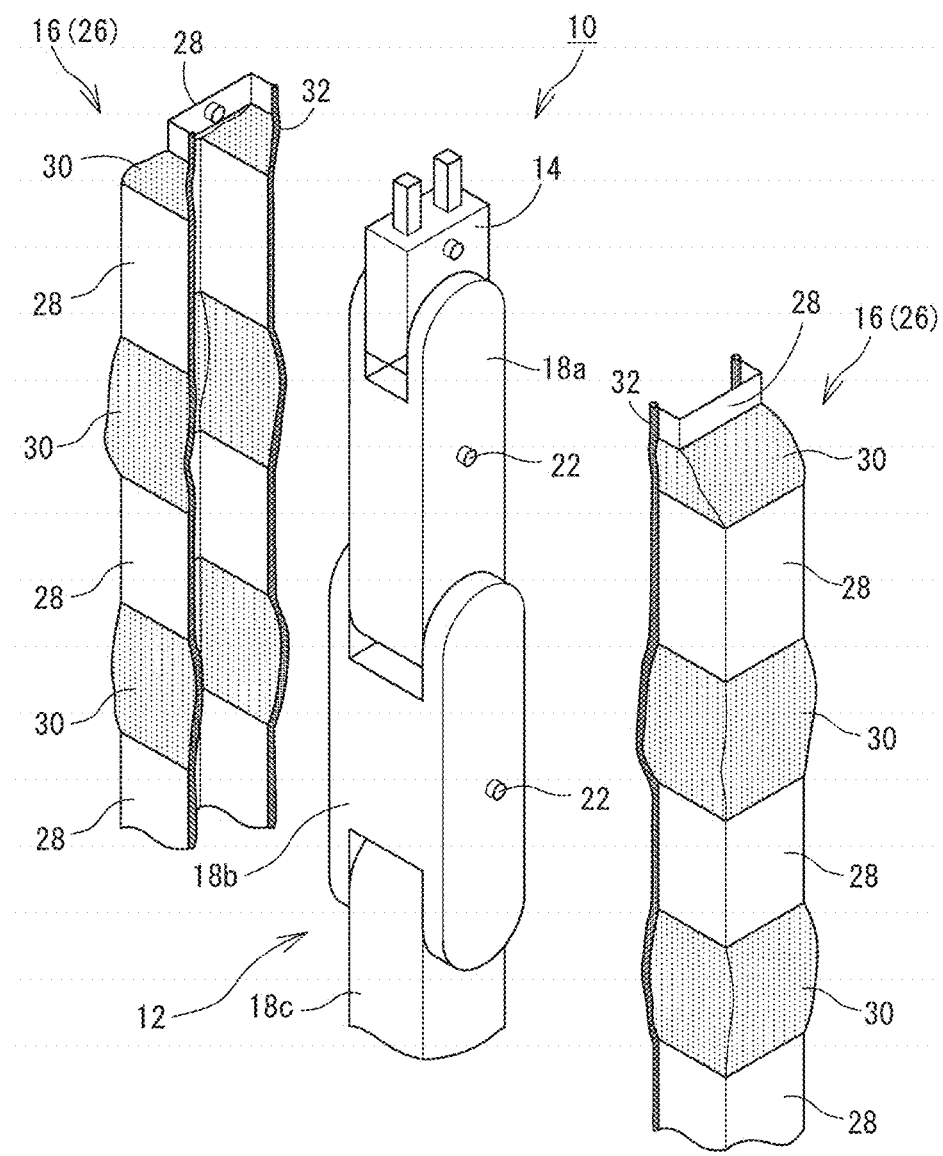
FIG. 4 shows an example of a united-type protective housing.

Two types of the protective housing 16 are available. One type is a separable type in which each of protective housing sections 16a to 16c covers one of the links 18a to 18c, whereas the other type is a united type which extends across two or more links 18a to 18c. FIG. 2 and FIG. 3 show an example of the separable-type protective housing 16, whereas FIG. 4 shows an example of the united-type protective housing 16.

Each of the separable-type protective housing sections 16a to 16c covers one of the links 18a to 18c. In other words, for example, the protective housing section 16a which covers one link 18a is completely separated from other protective housing sections 16b and 16c that cover other links 18b and 18c. In the present example, each protective housing section 16a, 16b, or 16c that covers the corresponding link 18a, 18b, or 18c is splittable into two in a lateral direction. Each half of the respective separable protective housing section 16a to 16c is referred to as a housing half 26. Each of the protective housing sections 16a to 16c has a sufficient rigidity to maintain the shape. The protective housing sections 16a to 16c form a slight gap between the adjacent protective housing sections 16a to 16c to avoid interfering movement (swing) of the adjacent links 18a to 18c. With the separable-type protective housing 16, because the protective housing sections 16a to 16c are separated for respective links 18a to 18c, movement of the arm 18 is not likely to be constrained. Further, because the properties of the protective housing sections 16a to 16c can be changed respectively for links 18a to 18c, the robot main body 12 can be more efficiently protected.

The united-type protective housing 16 is formed to extend across two or more adjacent links 18a to 18c. The protective housing 16 of this type is also splittable into two in a lateral direction to form housing halves 26. Each of the housing halves 26 includes multiple protecting portions 28, and one or more connecting portions 30 that connect the protecting portions 28. The protecting portions 28 at least partially cover the circumferential surface of the arm 18 and have a rigidity that can at least maintain the shape. The connecting portions 30 connect the protecting portions 28 and mainly cover the joints of the arm 18. Each connecting portion 30 is made from, for example, a rubber or plastic sheet or bellows material, having a flexibility to allow free deformation. Such connecting portions 30 allow a change in orientation relationships between the two adjacent protecting portions 28 to each other in accordance with movement of the joints. The united-type protective housing 16 can enhance waterproof and dustproof properties of the robot unit 10, because the robot unit 10 including the joints is covered.

The specific details of the protective housing 16, including the materials and the shapes, may be changed in accordance with the applications of the protective housing 16 as required. However, the portions of the protective housing 16 covering the circumferential surfaces of the links 18a to 18c (the whole housing for the separable type, and the protecting portions 28 for the united type; both are hereinafter referred to as a "link covering portion") may have a rigidity sufficient to maintain the shape. Thus, the arm covering portions may be made of a metal, a hard plastic, a carbon fiber, or the like.

In a case where rigid swarf scatters, the arm covering portions may be made from a material that is more rigid than the chassis of the arm 18 or the swarf. In another case where soft continuous swarf scatters, the arm covering portions may be made from a light material having a low rigidity (for example, a rigidity equal to that of the swarf). The protective housing 16 may have a shape (for example, a streamlined shape) to avoid swarf attachment or entanglement to the robot. In still another case where high temperature swarf scatters, the arm covering portions may be made from a material having a higher heat resistance than the chassis of the arm 18. In this case, the arm covering portions, partially or entirely, may include a thermal insulation material (for example, glass wool) or a thermal insulation structure to prevent heat transfer between the chassis of the arm 18 and the environment.

In another case where cutting water or oil scatters, the protective housing 16 may have liquid tightness. For example, the protective housing 16 may be the united type with the connecting portions 30 made from a waterproof material. Sealing portions 32 (for example, rubber portions, refer to FIG. 4) may be provided along edges of the protecting portions 28 so that the sealing portions 32 are tightly attached to the outer surfaces of the arm 18 or the opposing housing half 26. Because some cutting water may be so strong to cause corrosion of a metal, the protective housing 16 may be made from a material having a higher chemical resistance than the chassis of the arm 18.

The protective housing 16 may be used to change a dynamic rigidity or natural frequency of the robot main body 12. For example, when the end effector 14 (for example, a roller) is pressed against a workpiece to reduce vibration of the workpiece, the robot main body 12 may have a high dynamic rigidity. It may be desirable to change the natural frequency of the robot main body 12 so as to avoid resonance between the robot main body 12 and the workpiece. In these cases, the dynamic rigidity or natural frequency of the robot main body 12 may be changed by attaching to the robot main body 12 the protective housing 16 that serves as a weight robot main body. A deflection of the robot main body 12 changes in accordance with the weight of a target (workpiece or the like). The deflection may be controlled by adjusting the weight of the protective housing 16. Such a structure can improve a positioning accuracy. For any purposes, some types of the protective housing 16 of different weights may be provided to use the protective housing 16 as a weight.

The arm covering portions may have a surface on which a protective coating film (for example, plating) is applied. Such a configuration can maintain the performance of the arm covering portions, and thereby improve the life span of the protective housing 16 by repairing the protective coating film as required. Repairing may be performed inside or outside the machining chamber 102. For example, a repair device 120 (for example, a film coating device, refer to FIG. 1) may be provided inside the machining chamber 102 so that the protective coating film is repaired periodically or in accordance with the significance of damage of the protective coating film. In order to repair the protective coating film, the robot main body 12 may be driven to move the protective housing 16 attached to the robot main body 12 to be in the vicinity of the repair device 120. Then, the repair device 120 may be activated to repair the protective coating film of the protective housing 16.

Multiple protective housings 16 of different types may be provided in advance so that at least either the materials or the shapes of the protective housings 16 differ from one another. The protective housing 16 can be selected depending on the application, use environment, or machining progress of the robot main body 12 and attached to the robot main body 12. In some cases, the protective housing 16 may be omitted. In other words, the chassis of the arm may be exposed when using the robot main body 12.

The protective housing 16 may be manually replaced by a user, or replaced automatically using a device or by the robot itself. For example, two or more robot units 10 may be disposed inside the machining chamber 102 so that one of the robot units 10 replaces the protective housing 16 of the other robot unit 10. In another embodiment, the machine tool 100 may include a transfer device that transfers the protective housing 16. The protective housing 16 may be replaced by the robot main body 12 in cooperation with the transfer device.

When the protective housing 16 is attached to the robot main body 12, the protective housing 16 needs to be locked to prevent detachment of the protective housing 16. To remove the protective housing 16 from the robot main body 12, the lock needs to be released. When the protective housing 16 is replaced automatically, the lock of the protective housing 16 that allows attachment and detachment of the protective housing 16 may be locked or unlocked by a simple operation, such as a one-touch operation. As the one-touch mechanism, well-known mechanisms may be used. One example of the one-touch mechanism is described with reference to FIG. 5A to FIG. 5C. In the example in FIG. 5A to FIG. 5C, a lock pin 44 is fixed to the protective housing 16, while a lock case 42 is fixed to an arm chassis 20 of the robot main body 12. In this case, the lock case 42 serves as the fastening portion 22 that attach and detach the protective housing 16.

The lock case 42 has a substantially cylindrical shape into which the lock pin 44 is inserted. An inner circumferential surface of the lock case 42 includes a tapered surface 56 that is tilted to be opened radially wider at the bottom. The tapered surface 56 causes an inner diameter φ2 at a lower portion of the lock case 42 larger than an upper inner diameter φ1.

The lock pin 44 includes a barrel 46 that has a through hole along a longitudinal axis, and a reciprocating pin 48 that advances and retracts in the barrel 46. Small holes that radially penetrate through are provided near the proximal end of the barrel 46. Lock balls 52 described below are disposed in the holes. The reciprocating pin 48 includes a neck portion in the middle; in other words, the reciprocating pin 48 partially has a smaller diameter. In this way, the reciprocating pin 48 has a taper surface 58 that is tilted to be radially wider at the bottom. As the reciprocating pin 48 advances and retracts, a contact relationship between the taper surface 58 and the lock balls 52 changes such that the lock balls 52 are displaced radially inwards or outwards. The reciprocating pin 48 is biased towards a retracted position by the spring 50.

Figure 5A:
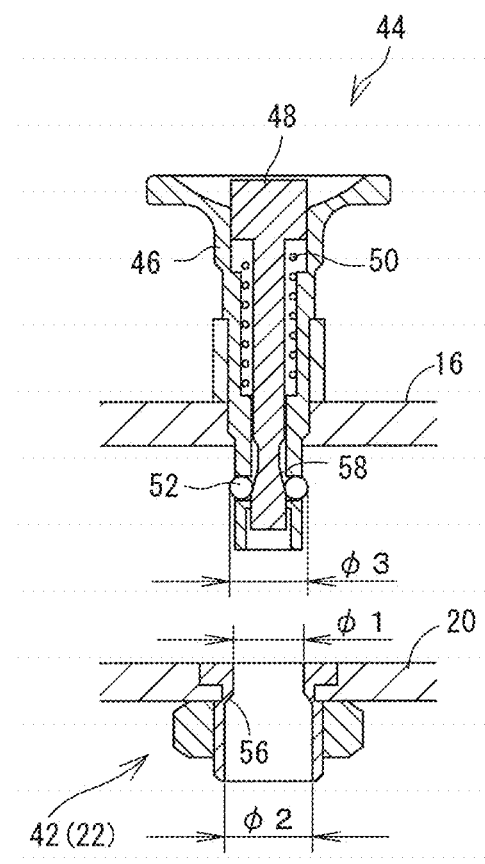
FIG. 5A is a diagram to describe an example of a one-touch lock mechanism.
Figure 5B:
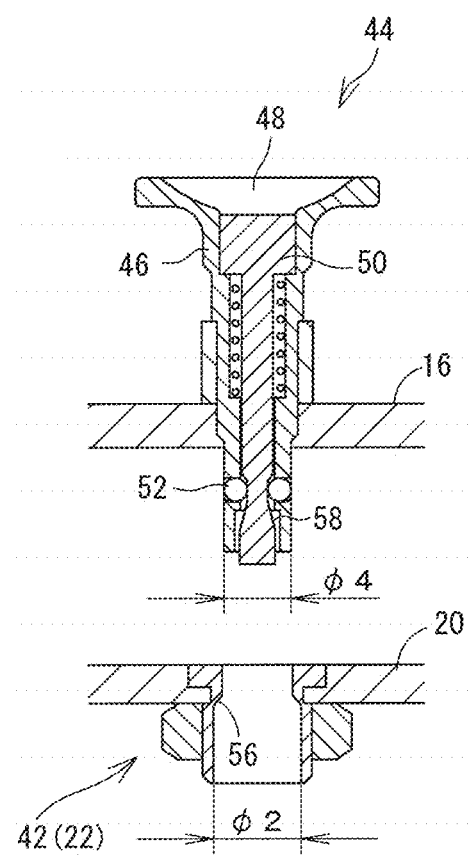
FIG. 5B is a diagram to further describe the example of the one-touch lock mechanism.

The lock balls 52 are disposed in the small holes formed in the barrel 46. As shown in FIG. 5A, when the reciprocating pin 48 is at the most retracted position with a biasing force of the spring 50, the lock balls 52 are pressed radially outwards by the taper surface 58. In this way, the lock balls 52 partially protrude outwards from the circumferential surface of the barrel 46. On this occasion, the outer diameter φ3 of the lock pin 44 at a position aligned with the lock balls 52 is larger than the upper inner diameter φ1 of the lock case 42 but smaller than the lower inner diameter φ2 of the lock case 42. As shown in FIG. 5B, when the reciprocating pin 48 is pressed further against the biasing force, the neck portion of the reciprocating pin 48 is aligned with the lock balls 52. On this occasion, the lock balls 52 are displaced more radially inwards than the outer surface of the barrel 46. Because the outer diameter φ4 of the barrel 46 is smaller than the inner diameter φ1 of the lock case 42, the lock pin 44 can be inserted into the lock case 42 under these conditions.

In the above structure, to attach the protective housing 16 to the arm chassis 20, the reciprocating pin 48 is pressed further against the biasing force of the spring 50 such that the lock pin 44 becomes insertable into the lock case 42. On this occasion, because the neck portion of the reciprocating pin 48 is aligned with the lock balls 52, the lock balls 52 can be displaced more inwards than the outer surface of the barrel 46. In this status, the lock pin 44 can be inserted into the lock case 42.

Figure 5C:
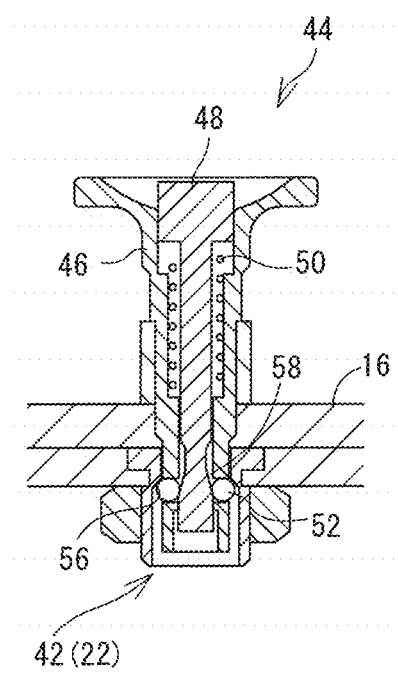
FIG. 5C is a diagram to still further describe the example of the one-touch lock mechanism.

As shown in FIG. 5C, when the lock pin 44 is completely inserted into the lock case 42, the lock balls 52 are almost aligned with the tapered surface 56 of the lock case 42. When the reciprocating pin 48 is released from the pressing force, the reciprocating pin 48 retracts under the force of the spring 50. As a result, the taper surface 58 of the reciprocating pin 48 abuts against the lock balls 52 at the lower side such that the lock balls 52 are displaced radially outward. In this status, because the lock balls 52 engage the tapered surface 56 of the lock case 42, the lock pin 44 is prevented from pulling out from the lock case 42. In this way, the protective housing 16 is securely attached to the arm chassis 20. To detach the protective housing 16 from the arm chassis 20, the protective housing 16 together with the lock pin 44 can be detached from the arm chassis 20 while pressing the reciprocating pin 48 further.

As is apparent from the above description, the configuration shown in FIG. 5 enables locking and unlocking of the protective housing 16 to and from the arm 18 simply by pressing or releasing the pressing of the reciprocating pin 48. Accordingly, the replacement of the protective housing 16 can be easily automated using a robot or any other means.

Figure 6:
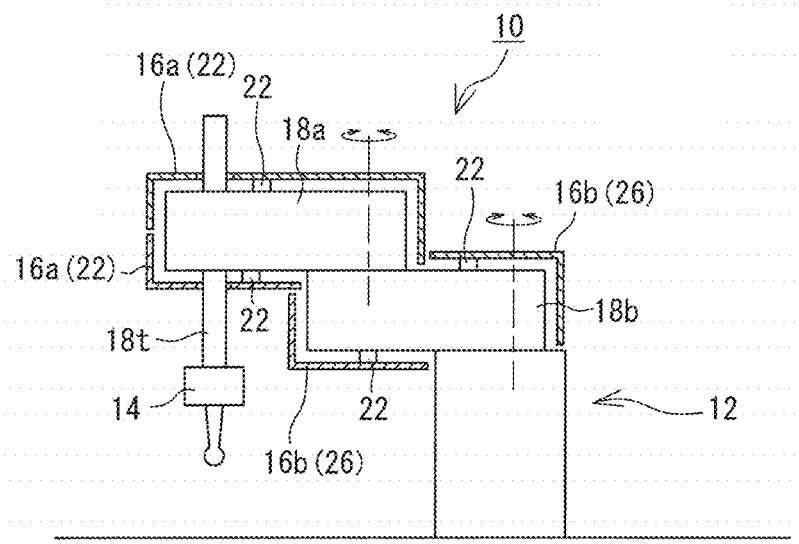
FIG. 6 shows another example of the robot unit.

Although the above description refers to a case where the robot main body 12 is a vertical articulated robot as an example, the robot main body 12 may be of a different type so long as the robot main body includes multiple links connected one another via at least one joint. For example, as shown in FIG. 6, the robot main body 12 may be a SCARA robot that includes multiple links 18a, 18b that are swingable about a vertical axis (swingable in a horizontal plane), and a distal link 18t that can advance or retract along the vertical axis. Also in such a case, fastening portions 22 that can attach or detach the protective housing 16 are provided on the circumferential surfaces of the links 18a, 18b. The protective housing 16 may be attached or detached via the fastening portions 22.

The protective housing 16 does not need to be attached to all the links 18a to 18c. The protective housing 16 may be provided for a specific link, such as the most distal link 18a. The protective housing 16 may be configured to cover not only the arm 18 and the joints but also part of the end effector 14.

The robot unit 10 described above may be installed not only inside the machining chamber 102 of the machine tool 100 but also at another location. For example, the robot unit 10 may be incorporated in another apparatus or independently installed without being incorporated in another apparatus. For example, the robot unit 10 may be independently installed in a production line. The robot unit 10 may be installed in an outdoor environment.

REFERENCE SIGNS LIST 10 robot unit, 12 robot main body, 14 end effector, 16 protective housing, 18 arm, 19 rotatable joint, 20 arm chassis, 22 fastening portion, 26 housing half, 28 protecting portion, 30 connecting portion, 32 sealing portion, 42 lock case, 44 lock pin, 46 barrel, 48 reciprocating pin, 50 spring, 52 lock ball, 56, 58 taper surface, 100 machine tool, 102 machining chamber, 104 enclosure, 106 door, 108 spindle, 110 tool post, 112 turret, 114 tool, 116 chuck, 118 controller, and 120 repair device.

The invention claimed is:

1. A robot unit comprising:
a robot main body being an arm-type robot having a plurality of links connected to one another via at least one joint and at least one chassis that covers the plurality of links and the at least one joint; and at least one protective housing that covers and protects at least a portion of a circumferential surface of the at least one chassis, wherein the circumferential surface of the at least one chassis has at least one fastening portion that makes the at least one protective housing attachable and detachable, wherein at least two of the at least one protective housing attachable to one of the at least one fastening portion respectively have types different from each other at least either in material or in shape, and wherein a protective housing of the at least two of the at least one protective housing that is attached to one of the at least one fastening portion is replaceable with another protective housing of the at least two of the at least one protective housing.

2. The robot unit according to claim 1, wherein the at least one protective housing includes at least one united-type protective housing that extends across two or more links of the plurality of links, and each of the at least one united-type protective housing comprises a plurality of protecting portions, each configured to cover at least a portion of a circumferential surface of corresponding one of the plurality of links, and at least one connecting portion that inseparably connects two protecting portions such that a change is allowed in relative orientation relationships between the two protecting portions.

3. The robot unit according to claim 1, wherein the at least one protective housing comprises at least one separable-type protective housing that covers only one of the plurality of links.

4. The robot unit according to claim 1, wherein the at least one protective housing is splittable into two or more protective housing sections; in a lateral direction of the plurality of links.

5. The robot unit according to claim 1, wherein the at least one protective housing is made from a material such that at least one of a thermal resistance temperature, rigidity, and chemical resistance of the material is higher than that of a chassis of the plurality of links.

6. The robot unit according to claim 1, wherein the at least one protective housing comprises a thermal insulation material or a thermal insulation structure that prevents heat transfer between ambient environment and a chassis of the plurality of links.

7. The robot unit according to claim 1, wherein the robot main body comprises one or more end effector connectors that attach and detach an end effector, and a plurality of end effectors having different types from each other either in material or in shape are attachable to the one or more end effector connectors and provided such that the end effector attached to one of the end effector connectors is replaceable.

8. The robot unit according to claim 1, wherein the robot main body is disposed inside a machining chamber of a machine tool.

* * * * *